May 8, 1962  C. L. EMMERICH  3,033,037
GRAVITY METER
Filed July 28, 1958  3 Sheets-Sheet 1
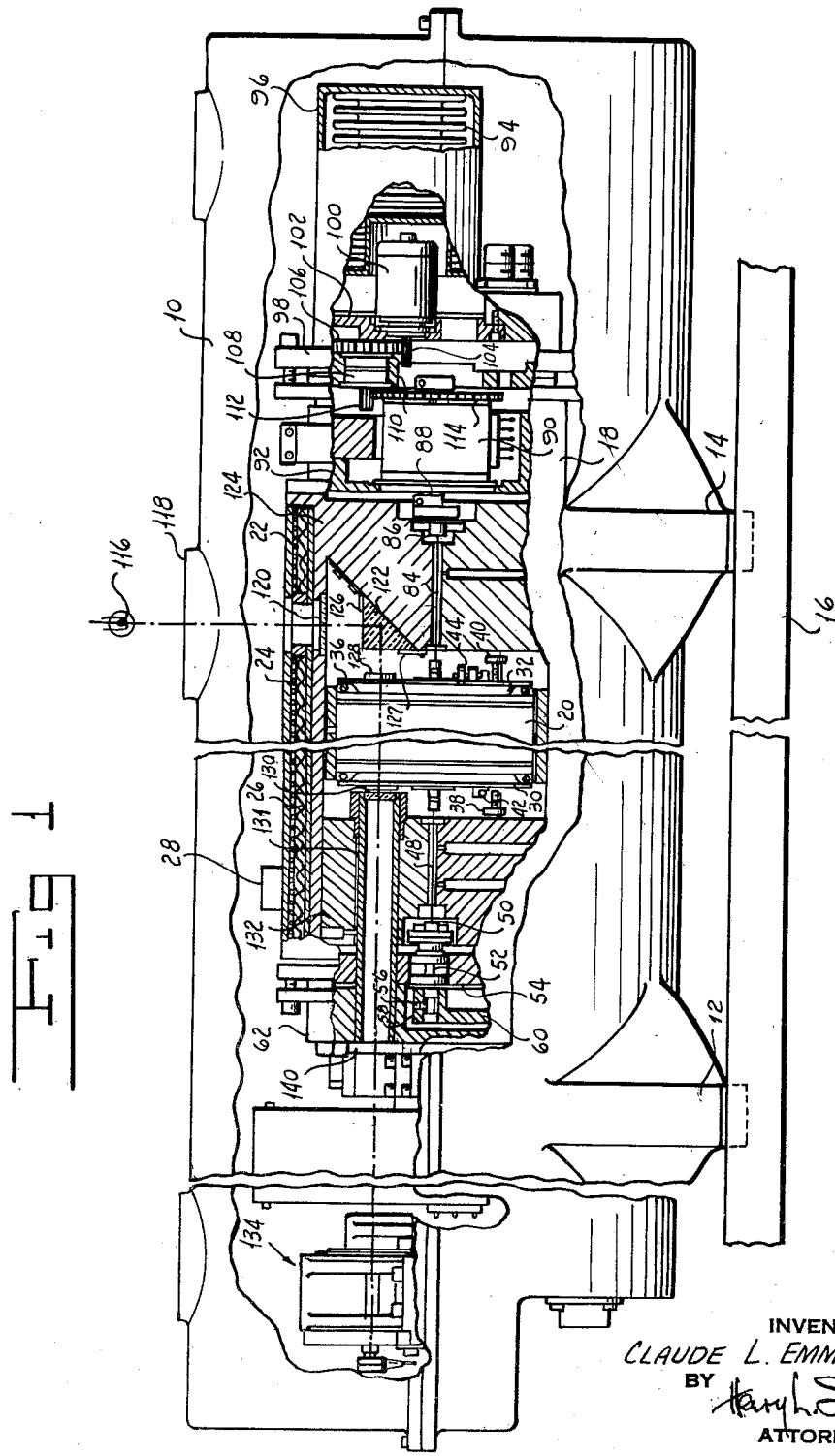
INVENTOR
CLAUDE L. EMMERICH
BY
ATTORNEY May 8, 1962
C. L. EMMERICH
3,033,037
GRAVITY METER
Filed July 28, 1958
3 Sheets-Sheet 2
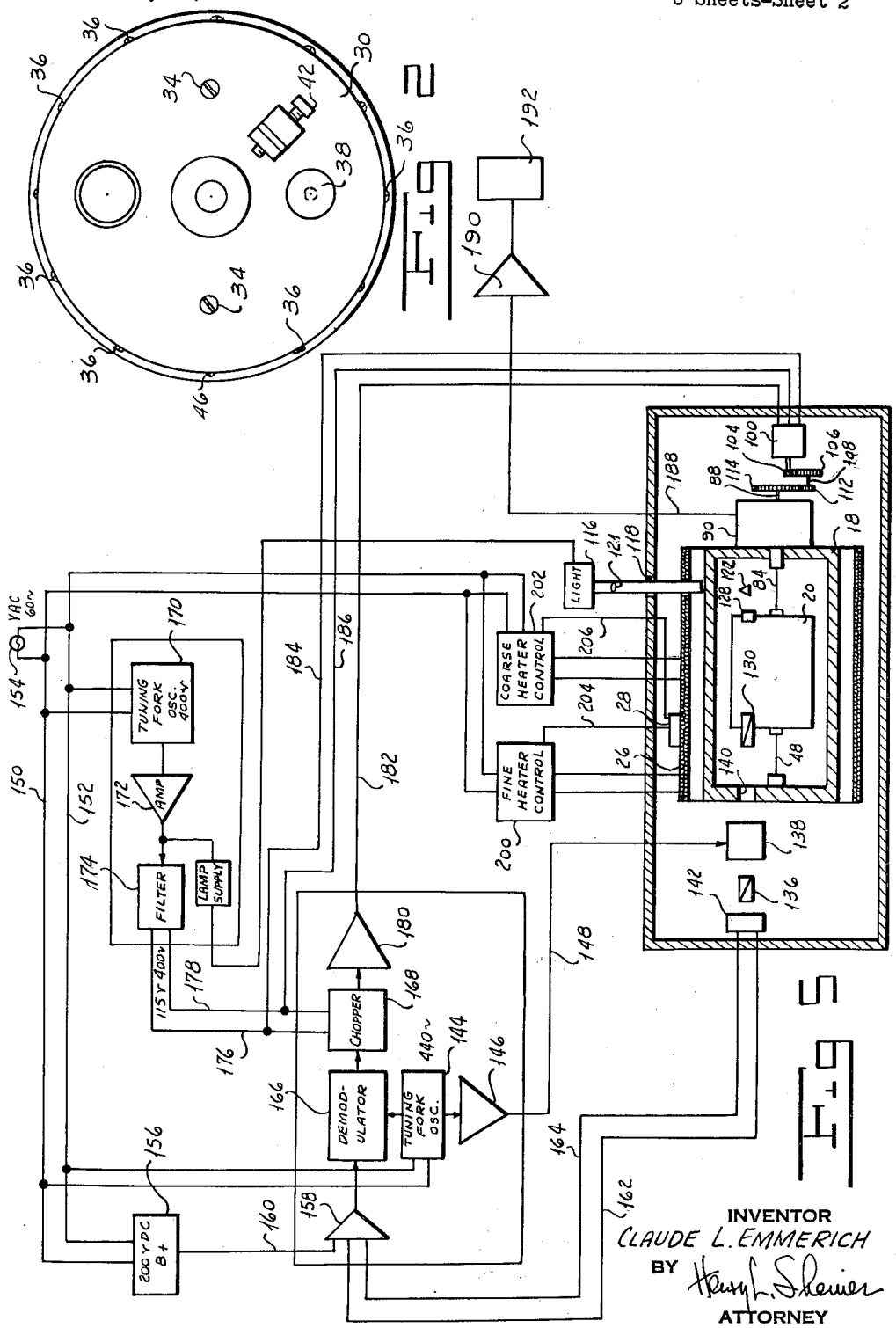
INVENTOR
CLAUDE L. EMMERICH
BY
ATTORNEY

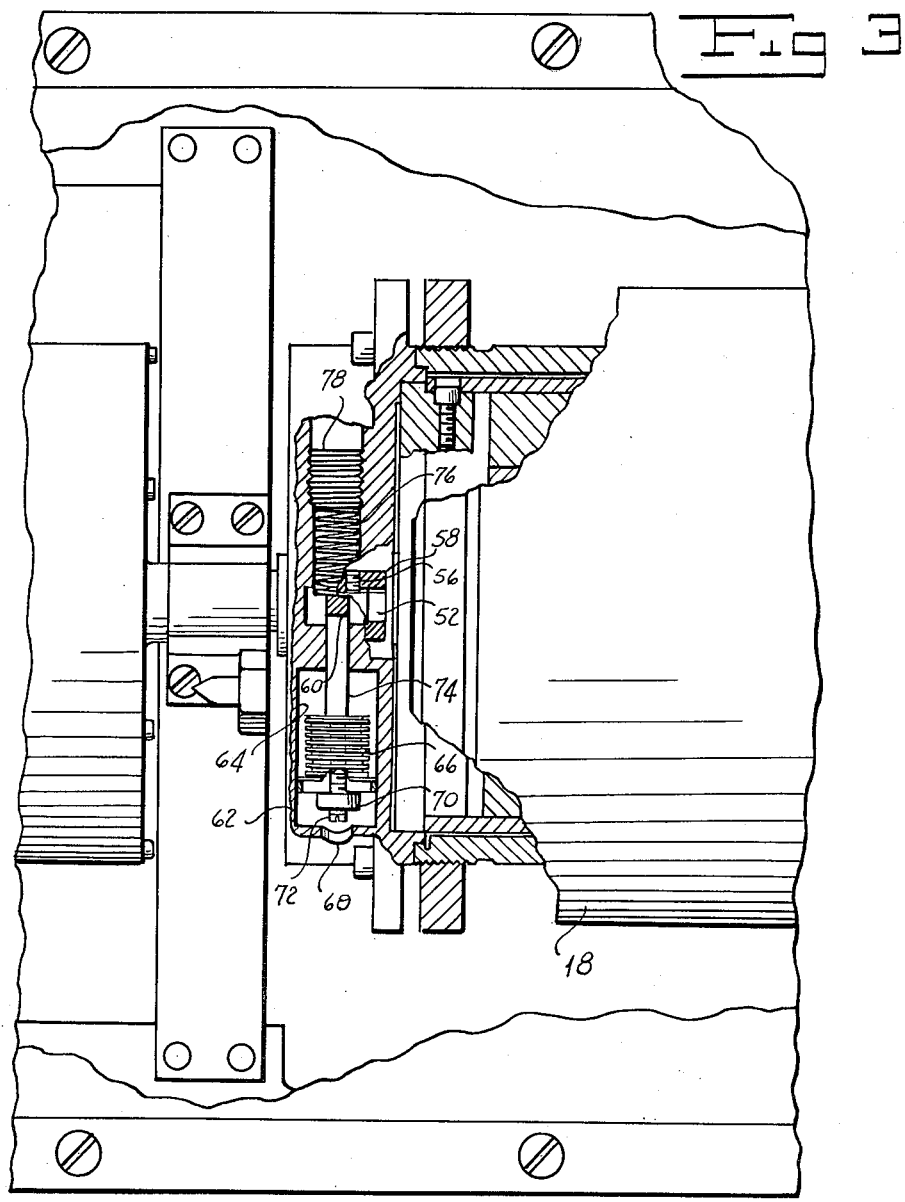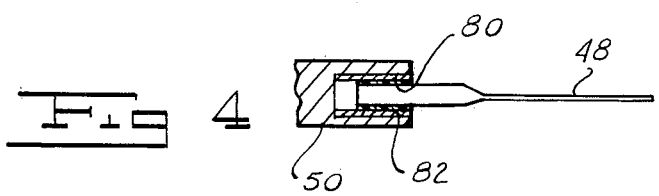

United States Patent Office 3,033,037
Patented May 8, 1962

3,033,037
GRAVITY METER
Claude L. Emmerich, Tarrytown, N.Y., assignor to United Aircraft Corporation, East Hartford, Conn., a corporation of Delaware
Filed July 28, 1958, Ser. No. 751,414
11 Claims. (Cl. 73—382)

My invention relates to a gravity meter and more particularly to an improved gravity meter for making accurate measurements of the acceleration of gravity from a moving vehicle such as a ship at sea.

The acceleration of gravity at different points on the surface of the earth varies between about 978 cm./sec.$^2$ at the equator to over 983 cm./sec.$^2$ at the poles, a total variation of only about 5 cm./sec.$^2$. It will be appreciated that with this extremely small variation, highly accurate measurements of changes in the acceleration of gravity must be made if useful results are to be obtained in localizing disturbances in the gravitational field. These measurements are particularly difficult to make if the gravity meter is supported on a moving vehicle which by its motion introduces vertical accelerations of the order of one hundred thousand times as large as the desired sensitivity of the instrument. Since the principle of equivalence states that gravitational accelerations are not distinguishable from extraneous vertical accelerations, the problem of making accurate measurements of the acceleration of gravity on a moving vehicle is an extremely difficult one.

I have invented an improved gravity meter which achieves a substantial separation of the gravitational acceleration from extraneous accelerations caused by the motion of the vehicle carrying my meter. My improved gravity meter permits accurate measurements of gravity to be made aboard a ship or the like.

My meter operates about a null position with the results that any error which might otherwise be introduced by nonlinearity in the detecting system is substantially eliminated. The construction of my system is such that its elastic hysteresis is very small. For this reason and since displacement of the moving member from its null position is very small, error owing to elastic hysteresis in my system is negligible.

One object of my invention is to provide an improved gravity meter with which accurate measurements of gravity may be made aboard a moving vehicle.

Another object of my invention is to provide a gravity meter for rapidly and accurately measuring the acceleration of gravity.

Another object of my invention is to provide a gravity meter which substantially eliminates error owing to nonlinearity of the components.

Another object of my invention is to provide a gravity meter in which there is negligible elastic hysteresis.

A further object of my invention is to provide a gravity meter which overcomes the disadvantages of meters of the prior art.

Other and further objects of my invention will appear from the following description.

In general my invention contemplates the provision of a gravity meter including a float buoyantly supported in a housing carried by a stable platform. The float of my system is pendulous so that gravity exerts a force on the float tending to displace it angularly. A torsion fiber having negligible elastic hysteresis is adapted to be twisted to apply a torque to the float to maintain the float in a null position against the action of the force resulting from the acceleration of gravity. A detecting system is adapted to produce an electrical signal proportional to the displacement of the float from the null position. A servomotor system responsive to the centering electrical signal produced by the detecting system applies a restoring force to the float through the torsion fiber connected to the float. The arrangement of my system is such that the centering electrical signal is always proportional to the change in the acceleration of gravity tending to displace the float from its null position. The restoring force or the torque in the torsion fiber is always proportional to the acceleration of gravity when the float is in its null position. In this manner I provide measurements of the acceleration of gravity which are accurate in the order of one part in one hundred thousand parts.

In the accompanying drawings which form part of the instant specification and which are to be read in conjunction therewith and in which like reference numerals are used to indicate like parts in the various views:

FIGURE 1 is a side elevation of one form of my gravity meter with parts broken away and with other parts shown in section.

FIGURE 2 is an end elevation of the float of my gravity meter.

FIGURE 3 is a fragmentary view of a portion of my gravity meter with parts broken away and with other parts shown in section.

FIGURE 4 is a fragmentary view of the torsion fiber mounting means employed in my gravity meter.

FIGURE 5 is a schematic view of the detecting, centering and indicating means employed in my gravity meter.

More particularly referring now to FIGURES 1 to 4 of the drawings, my gravity meter includes an outer casing 10, the wall of which is thermally insulated by any suitable means such as glass fiber insulation or the like. Legs 12 and 14 on casing 10 are mounted in a stabilized platform 16 which may be stabilized by any system known to the art, such, for example, as that disclosed in Patent No. 2,606,448, issued on August 12, 1952, to Carl L. Norden et al. The insulated casing 10 contains a housing 18 which I fill with a suitable fluid such, for example, as a silicone or a "Fluorolube" which latter is the registered trademark of the Hooker Electrochemical Co. for a trifluorovinyl chloride buoyantly to support the float 20 of my meter.

If this is done, any variation in the force buoying float 20 or in the damping effect exercised by the fluid on the float 20 will detract from the accuracy of the meter. To avoid inaccuracy from these causes I maintain the temperature of the fluid within housing 18 as nearly constant as is possible in order that the density and viscosity of the fluid remain substantially constant at all times. I provide the housing 18 with a vapor phase heater jacket 22 in which I disposed a fibrous wick 24 loosely carried in the housing and saturated with a vaporizable fluid such, for example, as "Freon 113," which is the registered trademark of E. I. du Pont de Nemours and Co. for trichlorotrifluoroethane. The vapor jacket 22 carries a coil 26 making up an electrical resistance heater. My meter may include a coarse electrical heater winding (not shown) disposed between jacket 22 and housing 10, if desired. A thermostat 28 carried by the housing 18 provides a means for actuating means for controlling the current through the heating coil to regulate the temperature of the fluid within housing 18 in a manner to be described. The wick 24 makes contact with the inner surface of the jacket 22 in a large number of places but most of the space within the jacket is occupied by vapor. As the fluid within housing 18 cools, some of the vapor in jacket 22 condenses and is brought by the the wick into contact with the resistance heater 26 where it is again vaporized. I have found that this arrangement ensures an even distribution of heat throughout the housing 18 and prevents the development of local hotspots within the housing which would affect the accuracy of the measurements made with the instrument.

I make the float 20 slightly pendulous but otherwise balance it very nearly exactly. The ends of the float 20 carry respective ball retainers 30 and 32 held on the float by any convenient means such as screws 34. Each retainer 30 and 32 holds a plurality of balls 36 on a respective end of the float. In making my float pendulous I first dispose a plurality of balls 36 of like weight made of a material such as aluminum or the like inboard of each retainer 30 and 32 at the sides of the float 20. I so position the balls that the weight of the float 20 and balls is distributed evenly with respect to both the longitudinal axis and a transverse axis of the float so that the float is very nearly perfectly balanced. I mount respective screws 38 and 40 on each end of the float for movement axially of the float. By means of these screws I may make a fine adjustment to balance the float about its athwartships or transverse axis. A second pair of respective screws 42 and 44 are mounted for movement radially of the float 20 to provide a fine adjustment for balancing the float about its longitudinal axis. When my float has thus been brought into very nearly perfect balance, I make it pendulous by removing one of the aluminum balls 36 from each end of the float at corresponding locations. I replace each of the two removed balls with a ball of a slightly greater weight such, for example, as a ball 46 formed of a material such as steel or tungsten. It will be appreciated that the float is now pendulous, tending to come to rest in a position with the balls 46 at the bottom of the float. The pendulosity of my float is very slight. For example, if my float weighs a total of 450 grams, the amount of pendulosity is of the order of only 3 gram-centimeters.

I connect a coarse torsion rod or fiber 48 between one end of the float 20 and a support 50 carried by a shaft 52 rotatably supported in a wall 54 in housing 18. I form this coarse torsion rod or fiber of a material having a very low elastic hysteresis such, for example, as a quartz fiber having a diameter of approximately 100 microns. My meter has means for adjusting the initial or null torque applied to float 20. Referring to FIGURES 1 and 3, set screws 56 secure the hub 58 of an arm 60 to an extension of shaft 52. I provide the end plate 62 of housing 18 with a recess 64 in which I mount a bellows 66. This bellows 66 provides the seal between the inside of housing 18 and an opening 68 in the plate 62 which permits access to the recess 64 to make an adjustment of the initial or average torque exerted on float 20. A bracket 70 in recess 64 carries a screw 72, the end of which is in engagement with the base of the bellows 66. The base of bellows 66 carries a push rod 74 in engagement with one side of arm 60. A spring 76 positioned by a plug screw 78 holds arm 60 in engagement with rod 74. When it is desired to make an adjustment of the initial torque on float 20 in one direction screw 72 is turned through opening 68 to act on the base of bellows 66 which in turn moves push rod 74 to move arm 60 to turn shaft 52 to twist fiber 48 in one direction. To make an adjustment in the other direction screw 72 is turned in the other direction and spring 76 acts on arm 60 to move it through such distance as it is permitted to move by rod 74.

If the very desirable mechanical properties of the quartz fiber 48 are not to be lost, great care must be used in securing the fiber to its support 50. I secure the fiber 48 to its support 50 and to the float 20 in a manner which permits advantage to be taken of the desirable mechanical properties of quartz. A quartz rod is first cemented within a sleeve 82 by means of an epoxy resin or the like and the fiber 48 is drawn from the rod. I secure the sleeve 82 within a bore 80 formed in the end of shaft 50. I secure the fiber 48 to the float 20 in a similar manner.

I secure a fine torsion fiber 84 formed of a material such as quartz between the float 20 and a support 86 carried by the shaft 88 of a potentiometer 90 supported in housing 18 by any convenient means such as a bracket 92. The fiber 84 may have a diameter of approximately 30 microns. It is secured to float 20 and to support 86 in the same manner as rod 48 is secured to support 50 and to float 20. It is to be understood that I secure the fibers 48 and 84 to float 20 and to their supports with their axes extending along a line passing through the center of buoyancy of the float. In this manner I avoid the introduction of unbalanced torques.

I dispose a bellows 94 in a housing 96 formed in the end plate 98 remote from plate 62. This bellows provides a seal between the interior of housing 18 and the housing 96 to permit the fluid within housing 18 to expand.

A servomotor 100 carried by a bracket 102 in housing 18 drives a pinion 104 which engages and drives a gear 106 carried by a shaft 108 rotatably supported in a bearing bracket 110 in housing 18. A pinion 112 carried by shaft 108 for rotation with the shaft drives a gear 114 carried by the shaft 88 of potentiometer 90 for rotation with the shaft. It will be understood that when motor 100 is energized, it drives shaft 88 through the intermediate gearing to twist fiber 84 to cause a torque to be applied to float 20.

In setting up my instrument for use, the coarse fiber 48 first is twisted through a number of turns corresponding to the initial torque which is to be applied to the float 20. This initial torque is best selected to be the average torque over the range of measurements for which the instrument is to be used. When this initial torque has been applied to the float 20, the heavier balls 46 are in a position at which gravity acts on the balls with a torque which is equal and opposite to the torque exerted by the coarse fiber 48. Any change in the force of gravity tends to cause a rotation of the float 20.

I provide a very accurate means for detecting any rotation of the float 20 without affecting the torsion balance. A beam of light from a source 116 passes through a window 118 in the wall of casing 10 and through a window 120 in the wall of housing 18 to a reflecting prism 122 retained on a support 124 in housing 18 by a pair of retaining brackets 126 and 127. Prism 122 directs the light beam through a window 128 in float 20 to a polarizer 130 carried by the float. The polarizer 130 may be of any type known to the art such, for example, as a Glan-Thompson prism. After passing through the prism 130 which polarizes the light, the beam is directed through a tube 131 carried by a support 132 to an analyzer, indicated generally by the reference character 134.

Referring now to FIGURE 5, I have shown my system for producing an electrical signal representing the rotation of float 20 and the system for restoring the float to its null or neutral position. The analyzer 134 may include, for example, a second polarizer 136 which may be a calcite Glan-Thompson prism and a Faraday cell 138 disposed between the polarizers 130 and 136. The light beam passing from the source 116 through window 118 passes through a collimating lens 121. After being directed toward window 128 by prism 122, the beam passes through polarizer 130, through a window 140 in end plate 62, through the Faraday cell 138, and through polarizer 136 to a photoelectric device 142 such, for example, as a lead sulphide cell. I so arrange the elements of my detector that in the null position of float 20 the planes of polarization of polarizers 130 and 136 are at right angles to each other. In this condition of the elements a minimum of light emerges from the element 136.

As is known in the art, a Faraday cell energized from a suitable source of electrical energy rotates the plane of polarization of a beam of light passing through the cell through an angle proportional to the strength of the electrical signal applied to the cell. A tuning fork oscillator 144 supplied with electrical energy from a source 154 through conductors 150 and 152 connected to the source terminals provides an electrical signal which is amplified by an amplifier 146 and applied by a channel 148 to the Faraday cell 138. The electrical signal applied to Faraday cell 138 oscillates the plane of polarization of the light beam passing through the cell. With the polarizers 130 and 136 in their null position the Faraday cell oscillates the plane of polarization about this null position to cause the photocell 142 to produce an oscillating output signal. With the polarizing elements in the null position this signal will contain only even order harmonics of the frequency of oscillator 144. If the polarizing elements 130 and 136 are rotated in one direction from the null position the Faraday cell scans a different portion of the response curve of the polarizers to cause the photocell 142 to produce an output signal having a fundamental component. In one direction of displacement from the null the output signal fundamental component is phase shifted 180° from the fundamental component for the other direction of displacement from the null.

A plate voltage circuit 156, supplied from source 154 through conductors 150 and 152, supplies an amplifier 158 through a channel 160. Respective conductors 162 and 164 apply the output signal from photocell 142 to amplifier 158. I feed the output signal of amplifier 158 to a phase sensitive demodulator 166 which supplies a chopper circuit 168. Oscillator 144 also feeds the demodulator 166. A tuning fork oscillator 170 supplied with electrical energy from conductors 150 and 152 supplies an amplifier 172. A filter 174 filters the output signal of amplifier 172 and conductors 176 and 178 apply the filter output to chopper circuit 168. In one form of my invention the source 154 may be, for example, 115 volt, 60 cycle, alternating current while the oscillator 170 produces 400 cycle voltage and oscillator 144 produces 440 cycle voltage. The chopper 168 produces an output signal which is amplified by an amplifier 180 to form the control phase of the two-phase signal applied to servomotor 100. A channel 182 conducts the signal from amplifier 180 to motor 100 while the conductors 184 and 186, supplied with 400 cycle voltage from filter 174, couple the other phase to motor 100.

As has been explained hereinabove, the shaft 88 of potentiometer 90 is driven by motor 100. The potentiometer produces an output signal proportional to the rotation of motor 100 resulting from a change in the force of acceleration of gravity. A channel 188 applies the potentiometer output signal to an operational amplifier circuit 190 which amplifies the signal and applies it to a suitable indicating, recording, or control device of any type known to the art.

The motion of the pendulus float 20 is damped by the viscosity of the fluid which supports it. It will be appreciated that this damping force reduces the effect of momentary extraneous accelerations on the meter readings while permitting the relatively steady gravitational acceleration to be sensed. I enhance this damping action by including in the amplifier circuit 190 a filter network which substantially reduces the transmission of high-frequency components of the signal. The cut-off frequency of the filter is readily adjustable ot accommodate the particular conditions of the motion on which the gravity meter is carried. A typical circuit for this type of filter is described in "Design of High-Pass, Low-Pass, and Band-Pass Filters Using Networks and Direct Current Amplifiers With Feedback" by C. C. Shumard, published in 11 R.C.A. Review (1950), pp. 534 to 564.

I incorporate the recorder or the like 192 in the system so that its full scale deflection represents only about four percent of the total range of the meter. This arrangement permits a precise interpretation of the output signal. Any convenient means such as a stepping switch (not shown), actuated when the recorder pen approaches either limit of its range of travel, may be incorporated in the recorder to switch the recorder range. Calibration signals and range indication signals may be recorded at regular time intervals by suitable control circuits.

As has been explained hereinabove, my meter includes a fine heater winding 26 and may include a coarse heater winding (not shown). I provide separate controls 200 and 202 for the fine and coarse heater windings. Thermostat 28 forms the actuating element for controls 200 and 202 to which it is connected by conductors 204 and 206.

In operation of my gravity meter I first twist coarse fiber 48 through a number of turns corresponding to the average or initial torque to be placed on float 20. If the polarizing elements are not then at the null position, photocell 142 produces an electrical signal proportional to the amount of displacement of float 20 from the null position. This signal is amplified and demodulated by demodulator 166. Chopper 168 and amplifier 180 convert this signal into the control phase signal for servomotor 100 to cause the motor to drive shaft 88 to twist fiber 84 to rotate float 20 in a direction toward the null to reduce the error signal to zero. At the same time potentiometer 90 produces an output signal proportional to the angle of twist of fiber 84 which corresponds to the change in gravitational force and thus to the acceleration of gravity.

It will be seen that I have accomplished the objects of my invention. I have provided a gravity meter which rapidly and accurately measures the acceleration of gravity. My meter substantially eliminates errors owing to nonlinearity of the system components. Measurements made with my gravity meter include substantially no error resulting from elastic hysteresis of the meter elements. My meter overcomes the disadvantages of meters of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A gravity meter including in combination a housing, a pendulous float having a center of buoyancy and having a center of gravity displaced from the center of buoyancy, fluid disposed in said housing for buoyantly supporting said float for rotation about an axis passing through the center of buoyancy, said float being subjected to the acceleration of gravity whereby to generate an unbalanced torque adapted to move said float, a first torsion filament connected between said housing and said float, means for twisting said first filament through a predetermined angle to apply an initial torque to the float to position the float in a null position against the action of an average acceleration of gravity, a second torsion filament, means connecting said second torsion filament to said float, means adapted to be energized to twist said second filament to apply a torque to said float to restore the float to its null position from which it is displaced in response to deviation of the acceleration of gravity from said average acceleration, means responsive to displacement of said float from its null position for producing a signal indicating the deviation of the acceleration of gravity from the average acceleration, means for applying said signal to said second filament-twisting means to twist said second filament to restore said float to its null position and means for indicating the amount of twist applied to said second filament as an indication of the value of the acceleration of gravity.

2. A gravity meter including in combination a housing, a pendulous float having a center of buoyancy and having a center of gravity displaced from the center of buoyancy, fluid disposed in said housing for buoyantly supporting said float for rotation about an axis passing through the center of buoyancy, said float being subjected to the acceleration of gravity whereby to generate an unbalanced torque adapted to move said float, a first torsion filament connected between said housing and said float, means for twisting said first filament through a predetermined angle to apply an initial torque to the float to position the float in a null position against the action of an average acceleration of gravity, a second torsion filament, means connecting said second torsion filament to said float, means adapted to be energized to twist said second filament to apply a torque to said float to restore the float to its null position from which it is displaced in response to deviation of the acceleration of gravity from said average acceleration, a first polarizer carried by said float, a second polarizer carried by said housing, a source of a beam of light means for directing said beam of light through said polarizers to produce a polarized beam of light having a normal plane of polarization defined by said polarizers, means adapted to be energized to rotate the plane of polarization of said polarized beam from said normal plane, means for energizing said rotating means continuously to oscillate the plane of polarization of said beam about said normal plane whereby to cause said polarizers to operate about a null, means responsive to light emerging from said second polarizer for producing a signal the phase of which represents the direction of displacement of the float and the magnitude of which represents the amount of displacement of the float and means responsive to said signal for energizing said second filament twisting means to urge said float to return to its null position.

3. A gravity meter as in claim 1 in which each of said torsion filaments is formed of quartz having a large diameter portion at each of its ends and in which said connecting means are secured to said large diameter end portions.

4. A gravity meter as in claim 1 including means for maintaining the temperature of said fluid substantially constant.

5. A gravity meter as in claim 1 including means for balancing said float.

6. A gravity meter as in claim 1 in which said torque-applying means comprises means for varying said initial torque.

7. A gravity meter including in combination a pendulous member, means for supporting said member to be subjected to the acceleration of gravity whereby to generate an unbalanced force adapted to move said member, means including a first torsion filament and means for twisting said filament through a predetermined angle to position said member in a null position against the action of an average acceleration of gravity, means including a second torsion filament and means adapted to be actuated to twist said second torsion filament for applying a restoring torque to said pendulous member to restore the member to its null position when the acceleration of gravity deviates from said average acceleration and means responsive to movement of said member from its null position under the action of said unbalanced force for actuating said second torsion filament-twisting means to restore said member to its null position.

8. A gravity meter as in claim 7 in which said first filament has a certain diameter and in which said second filament has a diameter which is substantially less than the diameter of said first filament.

9. A gravity meter as in claim 7 including means responsive to said second filament twisting means for producing an indication of the value of the acceleration of gravity.

10. A gravity meter including in combination a housing, a pendulous float having a center of buoyancy and having a center of gravity displaced from said center of buoyancy, a fluid disposed in said housing for buoyantly supporting said float for movement about an axis passing through said center of buoyancy to be subjected to the acceleration of gravity whereby to generate an unbalanced torque adapted to move said float, means including a first torsion filament having an axis substantially coincident with said float axis and means for twisting said first filament through a predetermined angle to apply an initial torque to said float normally to position the float in a null position against the action of an average acceleration of gravity, means including a second torsion filament having an axis substantially coincident with said float axis and means for twisting said second filament to apply a restoring torque to said float to restore the float to its null position upon the occurrence of a deviation of the acceleration of gravity from said average acceleration, sensing means for detecting displacement of said float from its null position, means responsive to said sensing means for actuating said second filament twisting means to apply a restoring torque to said float to return the float to its null position and means for measuring said restoring torque.

11. A gravity meter as in claim 10 in which said sensing means comprises means for producing an electrical signal having a magnitude representing the displacement of said float from its null position and a phase representing a direction of displacement of the float from its null position and in which said means for actuating said second filament twisting means comprises a motor and means for applying said electrical signal to said motor.

References Cited in the file of this patent

UNITED STATES PATENTS

| | | |
|---|---|---|
| 1,579,273 | Wright | Apr. 6, 1926 |
| 2,032,381 | Stoutenburgh | Mar. 3, 1936 |
| 2,124,968 | Ahrndt et al. | July 26, 1938 |
| 2,225,566 | Ide | Dec. 17, 1940 |
| 2,618,156 | Boucher | Nov. 18, 1952 |
| 2,681,574 | Jack et al. | June 22, 1954 |
| 2,856,240 | Breazeale et al. | Oct. 14, 1958 |
| 2,907,211 | Breazeale et al. | Oct. 6, 1959 |